United States Patent
Wei et al.

(10) Patent No.: US 11,743,799 B2
(45) Date of Patent: Aug. 29, 2023

(54) COMMUNICATIONS DEVICE, INFRASTRUCTURE EQUIPMENT, CORE NETWORK EQUIPMENT AND METHODS

(71) Applicant: Sony Corporation, Tokyo (JP)

(72) Inventors: Yuxin Wei, Basingstoke (GB); Samuel Asangbeng Atungsiri, Basingstoke (GB); Hideji Wakabayashi, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 236 days.

(21) Appl. No.: 17/264,846

(22) PCT Filed: Aug. 7, 2019

(86) PCT No.: PCT/EP2019/071260
§ 371 (c)(1),
(2) Date: Feb. 1, 2021

(87) PCT Pub. No.: WO2020/030713
PCT Pub. Date: Feb. 13, 2020

(65) Prior Publication Data
US 2021/0297923 A1   Sep. 23, 2021

(30) Foreign Application Priority Data
Aug. 8, 2018   (EP) .................................... 18188073

(51) Int. Cl.
*H04W 4/00*   (2018.01)
*H04W 36/32*   (2009.01)
(Continued)

(52) U.S. Cl.
CPC ............. *H04W 36/32* (2013.01); *H04W 8/02* (2013.01); *H04W 36/0088* (2013.01);
(Continued)

(58) Field of Classification Search
CPC ... H04W 36/32; H04W 8/02; H04W 36/0088; H04W 48/12; H04W 64/003; H04W 84/005
(Continued)

(56) References Cited

U.S. PATENT DOCUMENTS 7,035,646 B2 * 4/2006 Raffel ................... H04W 48/16
455/456.1
7,477,694 B2 * 1/2009 Sanderford, Jr. ... H04L 27/2331
375/261
(Continued)

FOREIGN PATENT DOCUMENTS

WO   2007/047370 A2   4/2007
WO   2018/028937 A1   2/2018

OTHER PUBLICATIONS

International Search Report and Written Opinion dated Feb. 19, 2020, received for PCT Application PCT/EP2019/071260, Filed on Aug. 7, 2019, 13 pages.
(Continued)

*Primary Examiner* — Amancio Gonzalez
(74) *Attorney, Agent, or Firm* — Xsensus LLP

(57) ABSTRACT

A method for a communications device in a coverage region of a first cell generated by a non-terrestrial network part of a wireless communications network, the first cell being a serving cell for the communications device, the method comprising determining whether the coverage area of the first cell overlaps with a region associated with a coverage area of at least one non-serving cell, and in response to determining that the coverage area of the serving cell overlaps with a region associated with a coverage area of at least one non-serving cell, initiating measurements of sig-
(Continued)

nals transmitted on a frequency which is used for transmissions by infrastructure equipment associated with the at least one non-serving cell.

20 Claims, 7 Drawing Sheets

(51) Int. Cl.
*H04W 8/02* (2009.01)
*H04W 36/00* (2009.01)
*H04W 48/12* (2009.01)
*H04W 64/00* (2009.01)
*H04W 84/00* (2009.01)

(52) U.S. Cl.
CPC ......... *H04W 48/12* (2013.01); *H04W 64/003* (2013.01); *H04W 84/005* (2013.01)

(58) Field of Classification Search
USPC .......................................................... 370/331
See application file for complete search history.

(56) References Cited

U.S. PATENT DOCUMENTS

| | | | | |
|---|---|---|---|---|
| 7,974,619 | B2* | 7/2011 | Dutta | H04W 8/12 455/552.1 |
| 8,868,086 | B2* | 10/2014 | Lee | H04W 36/08 455/448 |
| 9,408,095 | B2* | 8/2016 | Lightstone | H04W 72/23 |
| 9,476,715 | B2* | 10/2016 | Wharton | H04W 4/02 |
| 9,628,168 | B2* | 4/2017 | Wharton | H04B 7/18519 |
| 9,807,544 | B2* | 10/2017 | Lam | H04W 4/14 |
| 9,942,936 | B2* | 4/2018 | Paterour | H04L 43/16 |
| 10,123,218 | B1* | 11/2018 | Yang | H04W 60/04 |
| 10,165,452 | B2* | 12/2018 | Ramamurthi | H04W 16/28 |
| 10,244,385 | B2* | 3/2019 | Wang | H04W 8/24 |
| 10,326,852 | B2* | 6/2019 | Zhang | H04L 67/63 |
| 10,547,375 | B1* | 1/2020 | Iyer | H04W 52/34 |
| 2008/0045259 | A1* | 2/2008 | Shen | H04W 52/246 455/522 |
| 2008/0045260 | A1* | 2/2008 | Muharemovic | H04W 52/286 455/522 |
| 2017/0272131 | A1* | 9/2017 | Ananth | H04B 7/0413 |
| 2018/0176900 | A1* | 6/2018 | Rong | H04W 76/10 |
| 2021/0119698 | A1* | 4/2021 | Atungsiri | H04B 7/18541 |
| 2021/0144612 | A1* | 5/2021 | Wei | H04W 16/28 |
| 2021/0306927 | A1* | 9/2021 | Wei | H04W 36/32 |
| 2021/0329518 | A1* | 10/2021 | Sharma | H04B 7/18504 |
| 2022/0104175 | A1* | 3/2022 | Wei | H04B 7/18508 |
| 2022/0279404 | A1* | 9/2022 | Wakabayashi | H04W 36/0094 |
| 2022/0337310 | A1* | 10/2022 | Wei | H04W 48/16 |

OTHER PUBLICATIONS

Thales et al., "NR-NTN: Preliminary Solutions for NR to Support Non-terrestrial Networks", 3GPP TSG RAN Meeting #80, RP-180664, Jun. 11-14, 2018, 16 pages.

Sony, "Discussions on Handover in NTN", 3GPP TSG RAN WG1 Meeting #93, R1-1807243, May 21-25, 2018, 5 pages.

3GPP, "Study on New Radio (NR) to Support Non Terrestrial Networks", TR 38.811 V1.0.0, Release 15, Jun. 2018, pp. 1-144.

Holma et al., "LTE for UMTS OFDMA and SC-FDMA Based Radio Access", John Wiley and Sons, 2009, pp. 25-27.

* cited by examiner

COMMUNICATIONS DEVICE, INFRASTRUCTURE EQUIPMENT, CORE NETWORK EQUIPMENT AND METHODS

CROSS-REFERENCE TO RELATED APPLICATIONS

The present application is based on PCT filing PCT/EP2019/071260, filed Aug. 7, 2019, which claims priority to EP 18188073.3, filed on Aug. 8, 2018, the entire contents of each are incorporated herein by reference.

BACKGROUND

Field

The present disclosure relates to communications devices, infrastructure equipment, core network equipment and methods for the operation of a communications device in a cell of a wireless communications network provided by a non-terrestrial network part.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the third generation partnership project (3GPP) defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless telecommunications systems that need to be addressed.

SUMMARY

The present disclosure can help address or mitigate at least some of the issues discussed above.

According to the present technique there is provided a method for a communications device in a coverage region of a first cell generated by a non-terrestrial network part of a wireless communications network, the first cell being a serving cell for the communications device, the method comprising determining whether the coverage area of the first cell overlaps with a region associated with a coverage area of at least one non-serving cell, and in response to determining that the coverage area of the serving cell overlaps with a region associated with a coverage area of at least one non-serving cell, initiating measurements of signals transmitted on a frequency which is used for transmissions by infrastructure equipment associated with the at least one non-serving cell.

Embodiments of the present technique can provide an arrangement which may provide an improved cell measurement scheme for supporting mobility of a communications device being served by a non-terrestrial network part.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
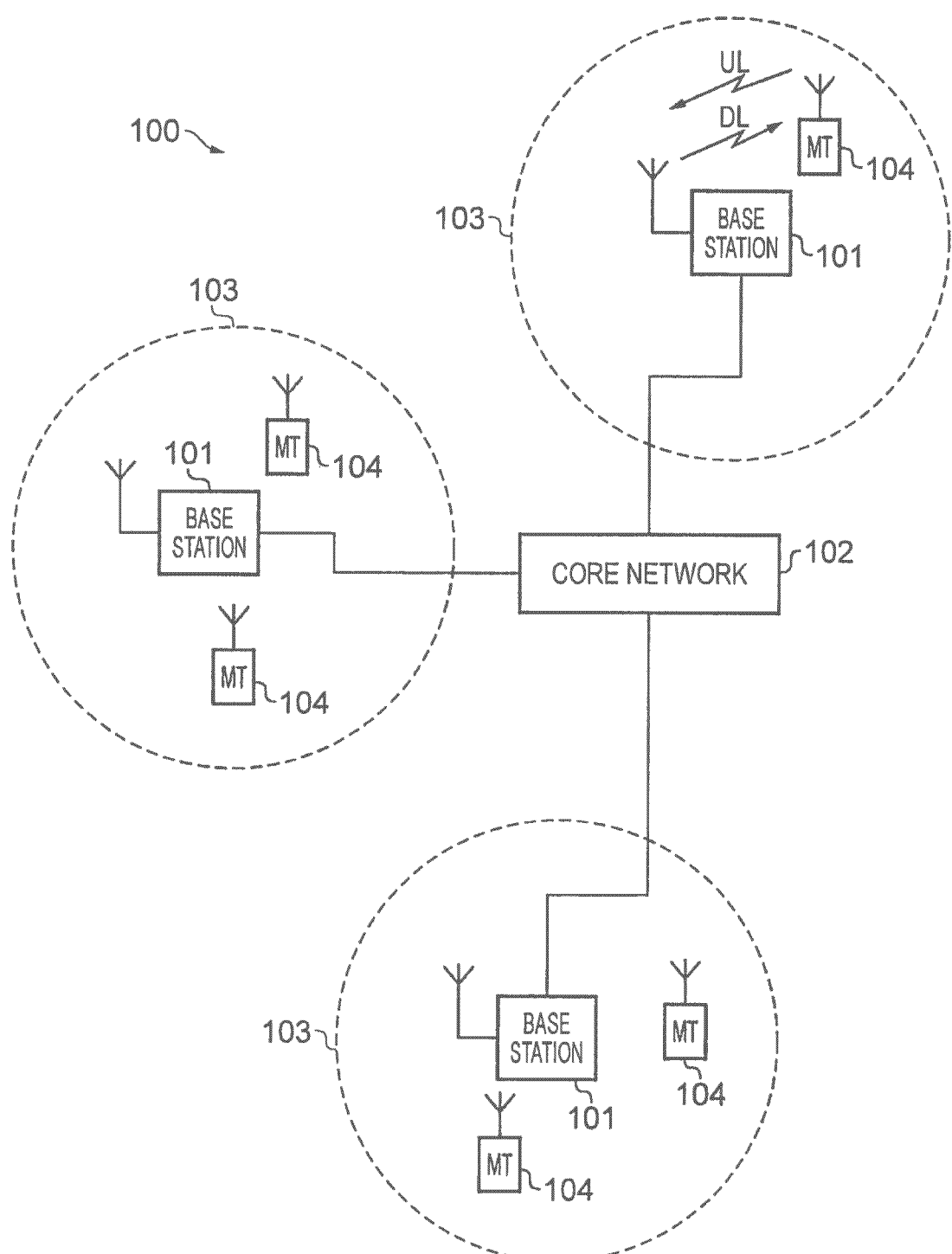
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
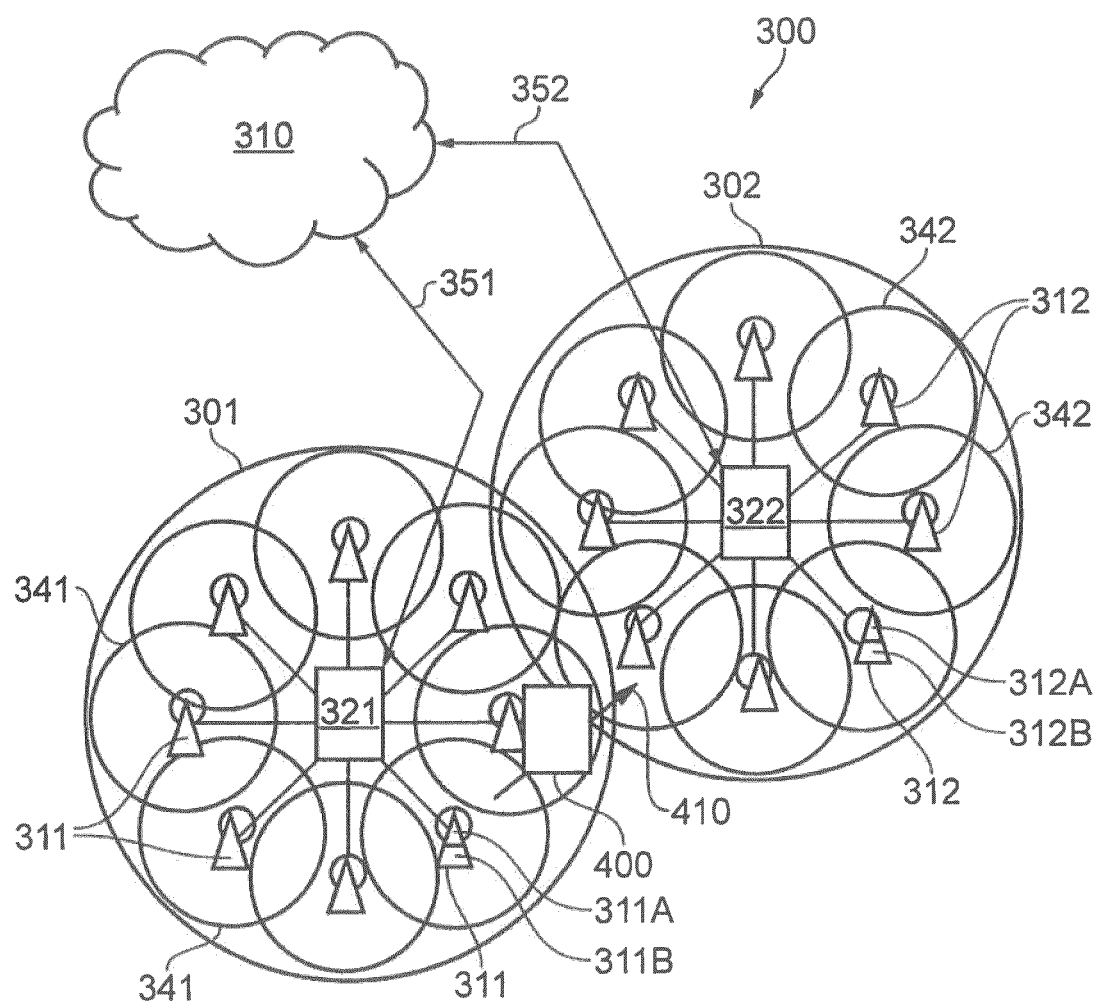
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network.

After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

Measurements by a communications device of signals transmitted by infrastructure equipment which is generating a cell other than the serving cell of the communications device may be used to detect whether a communications device is within, or close to, a coverage area of the different cell. Such signals may comprise an indication of the cell's identity, so that the communications device is able to determine which cell or cell(s) the transmissions correspond to, if the signals of multiple cells are transmitted on the same frequency.

In addition to measurements to determine whether the communications device is within or near the coverage of a non-serving cell, the communications device may perform measurements of signals transmitted in its serving cell in order to assess whether the current serving cell remains appropriate.

Measurements may be made in an idle mode (where the device is not actively transmitting or receiving data, and may not have an active connection with the infrastructure associated with the serving cell) for the purposes of autonomous (i.e. device-controlled) mobility. Measurements may be additionally or alternatively made in a connected mode (where the device is actively transmitting or receiving data, and may have an active connection with the infrastructure associated with the serving cell) for the purposes of autonomous (i.e. device-controlled) mobility and/or network-controlled mobility. In the case of network-controlled mobility (e.g. handover), results of the measurements may be transmitted to the serving infrastructure equipment in order to permit the wireless communications network to determine whether a cell change is necessary (and if so, to which new cell).

To support these measurements, infrastructure equipment may transmit reference signals in each cell continuously or periodically according to a pre-determined transmission schedule on a frequency (or in a band, centred on a frequency) which is configured by the wireless communications network operator.

Measurements (including decoding, where applicable) of such signals can consume a significant amount of power, thus affecting battery life of a battery-powered communications device. In general, power consumption associated with such measurements may be more dependent on the number of distinct frequencies on which the signals are to be received and decoded than on the number of cells which are measured.

If the communications device is performing measurements of its serving cell in any case, then the additional power consumption required to detect and measure additional cells which use the same frequency as the serving cell may be lower than the additional power consumption required to measure signals of other cells which are transmitted on different frequencies.

Conventionally, a communications device may receive a list of 'carrier' frequencies to measure, from a serving network part (e.g. infrastructure equipment) and which may be specific to its serving cell.

Since terrestrial networks are generally static, the list of carrier frequencies typically does not vary over time and is the same for all communications devices within the coverage area of the cell. Therefore, to minimize communications resources used to transmit the list of carrier frequencies, the list may be broadcast periodically in system information. Once a communications device has received the system information associated with its serving cell, it need not receive (or attempt to decode) the system information again while it is located within the coverage area of the serving cell if that stored system information remains valid. System information may generally provide information on the operation of the wireless communications network, particularly in the cell in which it is transmitted (or with which it is associated), and may be not specific to a particular communications device. System information may be broadcast according to a particular schedule, and thus may be received by multiple communications devices. Alternatively, the system information may be transmitted to a specific communications device.

Exceptionally, in conventional terrestrial networks, system information may change (for example, because a new infrastructure equipment has been enabled, providing one or more new cells in the region of the serving cell). In order to trigger communications devices to refresh their stored system information, a paging message may be transmitted by the infrastructure equipment associated with the serving cell with an indication that the system information has changed. In response to receiving such an indication, the communications devices may receive and decode the updated system information.

Figure 3:
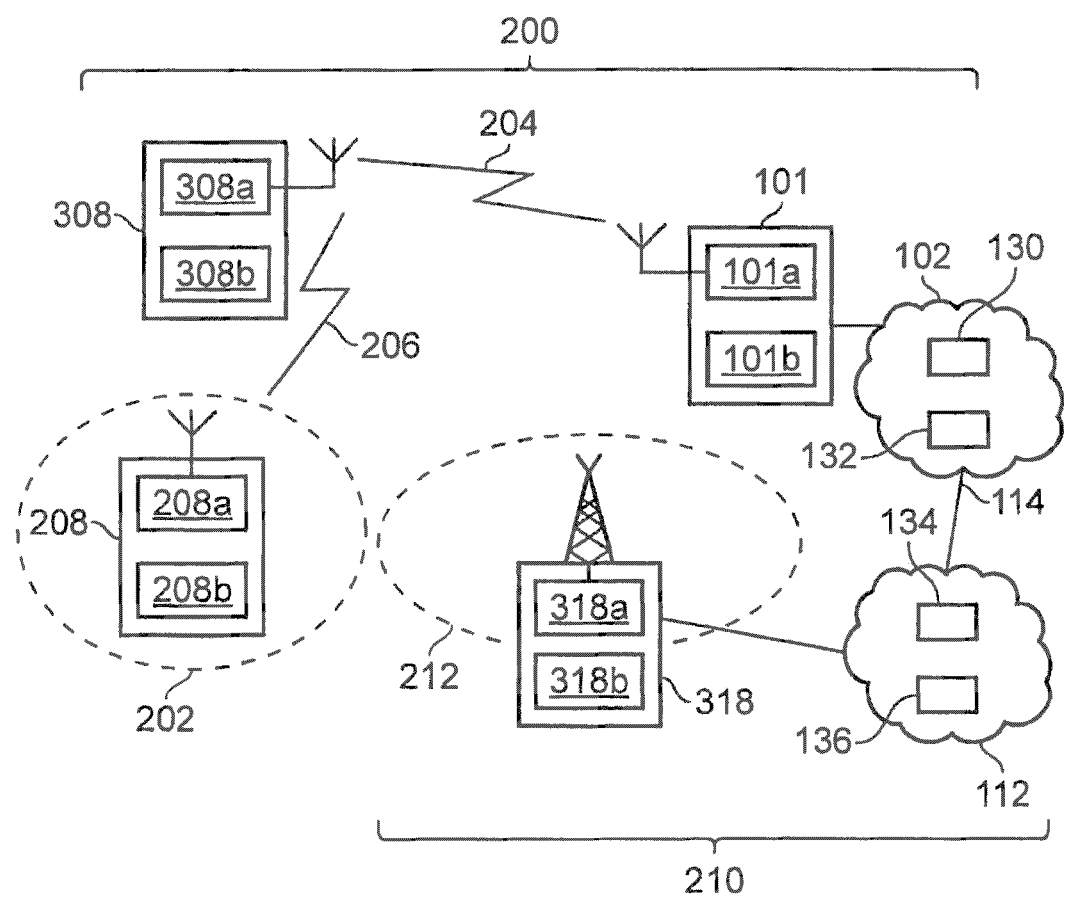
FIG. 3 schematically represents some example aspects of wireless telecommunication systems in accordance with embodiments of the present disclosure.

FIG. 3 schematically shows a non-terrestrial wireless telecommunications system 200 and a terrestrial wireless telecommunications system 210 according to an example embodiment of the present disclosure. The non-terrestrial wireless telecommunications system 200 and the terrestrial wireless telecommunications system 210 in this example are based broadly around an LTE-type or 5G-type architecture. Many aspects of the operation of the wireless telecommunications systems/networks 200, 210 are known and understood and are not described here in detail in the interest of brevity. Operational aspects of the wireless telecommunications systems 200, 210 which are not specifically described herein may be implemented in accordance with any known techniques, for example according to the current LTE-standards or the proposed 5G standards.

The non-terrestrial wireless telecommunications system 200 and terrestrial wireless telecommunications system 210 may be operated by a common commercial entity or may be integrated in a single wireless telecommunications system. The core network parts 102, 112 may be integrated (e.g. be connected through peering connections) or may be common to both systems.

The non-terrestrial wireless telecommunications system 200 comprises a core network part 102 (which may be a 4G core network or a 5G core network) coupled to a radio network part. The radio network part comprises a non-terrestrial base station (g-node B) 101 coupled to a non-terrestrial network part 308. The non-terrestrial network part 308 may be an example of infrastructure equipment.

The non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308.

The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit such that the non-terrestrial network part 308 does not move substantially with respect to a fixed point on the Earth's surface. The geo-stationary earth orbit may be approximately 36,000 km above the Earth's equator. Alternatively, the satellite may be in a non-geostationary orbit, so that the non-terrestrial network part 308 moves with respect to a fixed point on the Earth's surface.

The non-terrestrial network part 308 may be an airborne vehicle such as an aircraft, or may be mounted on such a vehicle. The airborne vehicle (and hence the non-terrestrial network part 308) may be stationary with respect to the surface of the Earth (e.g. it may be tethered to a fixed point on the surface of the earth) or may move with respect to the surface of the Earth.

Although the non-terrestrial wireless communications network 200 is shown as not comprising any terrestrial base stations, in some embodiments, the non-terrestrial wireless communications network 200 may in fact comprise terrestrial base stations. Similarly, although the terrestrial wireless communications network 210 is shown as not comprising any non-terrestrial base stations or non-terrestrial network parts, in some embodiments, the terrestrial wireless communications network 210 may in fact comprise non-terrestrial base stations and/or non-terrestrial network parts.

In FIG. 3, the non-terrestrial base station 101 is shown as ground-based, and coupled to the non-terrestrial network part 308 by means of a wireless communications link 204. The non-terrestrial network part 308 receives signals representing downlink data transmitted by the non-terrestrial base station 101 on the wireless communications link 204 and, based on the received signals, transmits signals representing the downlink data via the wireless communications link 206 providing the wireless access interface for the communications device 208. Similarly, the non-terrestrial network part 308 receives signals representing uplink data transmitted by the communications device 208 via the wireless access interface comprising the wireless communications link 206 and transmits signals representing the uplink data to the non-terrestrial base station 101 on the wireless communications link 204.

In some embodiments, the wireless communications links 204, 206 operate at a same frequency; in some embodiments, the wireless communications links 204, 206 operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206.

Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

In some embodiments, the non-terrestrial network part 308 may be configured to perform some of the functionality conventionally carried out by the non-terrestrial base station 101. In particular, latency-sensitive functionality (such as acknowledging a receipt of the uplink data, or responding to a random access channel (RACH) request in accordance with some embodiments of the present technique) may be performed by the non-terrestrial network part 308 instead of by the non-terrestrial base station 101.

In some embodiments, the non-terrestrial base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the non-terrestrial base station 101 and the non-terrestrial network part 308. In such embodiments, a wireless communications link between the non-terrestrial base station 101 and a ground station (not shown) may provide connectivity between the non-terrestrial base station 101 and the core network part 102.

The communications device 208 shown in FIG. 3 may broadly correspond to the terminal device 104 of FIG. 1 or the terminal device 400 of FIG. 2. Additionally or alternatively, the communications device 208 may be configured to act as a relay node. That is, it may provide connectivity via a wireless access interface to one or more terminal devices, not shown in FIG. 3. The wireless access interface provided by the communications device 208 for the purposes of providing service and connectivity to terminal devices may comply substantially with the standards for a wireless access interface generated by a base station in accordance with standards, such as the LTE standard or a 5G standard. Data may thus be transmitted by a terminal device to the communications device 208 and by the communications device 208 to the terminal device in accordance with conventional techniques for transmission of data to a conventional base station or a conventional relay node.

It will be apparent that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

The terrestrial wireless telecommunications system 210 comprises a core network part 112 (which may be a 5G core network or a NG core network) coupled to a radio network part. The radio network part comprises a terrestrial base station (g-node B) 318. The terrestrial base station 318 may be an example of infrastructure equipment.

The core network parts 102, 112 may be connected by an inter-network link 114.

The terrestrial base station 318 generates a terrestrial cell 212, in which communications devices (such as the communications device 208 may obtain service via a wireless access interface. The wireless access interface may operate in accordance with LTE or 5G principles. As such, the terrestrial base station 318 may correspond broadly to the infrastructure equipment of FIG. 2, described above, or the non-terrestrial base station 101 of FIG. 1, described above.

As described above, non-terrestrial networks may provide benefits, relative to terrestrial networks, in terms of significantly expanded coverage regions. However, where a communications device may obtain service via either a terrestrial network or via a non-terrestrial network (i.e., both are available), there may be significant benefits from using the former. For example, latency may be much lower, and available bandwidth capacity higher, when using the terrestrial network; in addition, the use of non-terrestrial networks may be subject to higher costs. Transmission power and receiver processing power may be reduced when using a terrestrial network due to the lower path loss between the communications device and the respective infrastructure equipment.

There is thus a need to ensure that a communications device is able to select an appropriate cell while avoiding excessive power consumption.

According to embodiments of the present disclosure, there is provided a method for a communications device in a coverage region of a first cell generated by a non-terrestrial network part of a wireless communications network, the first cell being a serving cell for the communications device, the method comprising determining whether the coverage area of the first cell overlaps with a region associated with a coverage area of at least one non-serving cell, and in response to determining that the coverage area of the serving cell overlaps with a region associated with a coverage area of at least one non-serving cell, initiating measurements of signals transmitted on a frequency which is used for transmissions by infrastructure equipment associated with the at least one non-serving cell.

As shown in FIG. 3, the non-terrestrial base station 101 comprises transceiver circuitry 101a (which may also be referred to as a transceiver/transceiver unit) for transmission and reception of wireless signals and processor circuitry 101b (which may also be referred to as a processor/processor unit) configured to control the non-terrestrial base station 101 to operate in accordance with embodiments of the present disclosure as described herein. The processor circuitry 101b may comprise various sub-units/sub-circuits for providing desired functionality as explained further herein. These sub-units may be implemented as discrete hardware elements or as appropriately configured functions of the processor circuitry. Thus the processor circuitry 101b may comprise circuitry which is suitably configured/programmed to provide the desired functionality described herein using conventional programming/configuration techniques for equipment in wireless telecommunications systems. The transceiver circuitry 101a and the processor circuitry 101b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the non-terrestrial base station 101 will in general comprise various other elements associated with its operating functionality.

The non-terrestrial network part 308 comprises transceiver circuitry 308a (which may also be referred to as a transceiver/transceiver unit) for transmission and reception of wireless signals and processor circuitry 308b (which may also be referred to as a processor/processor unit) configured to control the non-terrestrial network part 308. The processor circuitry 308b may comprise various sub-units/sub-circuits for providing functionality as explained further herein. These sub-units may be implemented as discrete hardware elements or as appropriately configured functions of the processor circuitry. Thus the processor circuitry 308b may comprise circuitry which is suitably configured/programmed to provide the desired functionality using conventional programming/configuration techniques for equipment in wireless telecommunications systems. The transceiver circuitry 308a and the processor circuitry 308b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the non-terrestrial network part 308 will in general comprise various other elements associated with its operating functionality.

The communications device 208 comprises transceiver circuitry 208a (which may also be referred to as a transceiver/transceiver unit) for transmission and reception of wireless signals. The communications device 208 is configured to provide connectivity via the non-terrestrial base station 101 and (though not necessarily simultaneously) via the non-terrestrial network part 308. For example, the transceiver circuitry 208b may be adapted in accordance with the nature of the communications channel to the non-terrestrial network part 308, which may be characterized by a high path loss and an absence of multipath.

The communications device 208 further comprises processor circuitry 208b (which may also be referred to as a processor/processor unit) configured to control the communications device 208. The processor circuitry 208b may comprise various sub-units/sub-circuits for providing functionality as explained further herein. These sub-units may be implemented as discrete hardware elements or as appropriately configured functions of the processor circuitry. Thus the processor circuitry 208b may comprise circuitry which is suitably configured/programmed to provide the desired functionality using conventional programming/configuration techniques for equipment in wireless telecommunications systems. The transceiver circuitry 208a and the processor circuitry 208b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the communications device 208 will in general comprise various other elements associated with its operating functionality.

The terrestrial base station 318 comprises transceiver circuitry 318a (which may also be referred to as a transceiver/transceiver unit) for transmission and reception of wireless signals and processor circuitry 318b (which may also be referred to as a processor/processor unit) configured to control the terrestrial base station 318 to operate in accordance with embodiments of the present disclosure as described herein.

The processor circuitry 318b may comprise various sub-units/sub-circuits for providing desired functionality as explained further herein. These sub-units may be implemented as discrete hardware elements or as appropriately configured functions of the processor circuitry. Thus the processor circuitry 318b may comprise circuitry which is suitably configured/programmed to provide the desired functionality described herein using conventional programming/configuration techniques for equipment in wireless telecommunications systems. The transceiver circuitry 318a and the processor circuitry 318b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terrestrial base station 318 will in general comprise various other elements associated with its operating functionality.

It will be appreciated that in practice the non-terrestrial radio network part of the non-terrestrial wireless communications network 200 may comprise a plurality of base stations and non-terrestrial network parts serving a larger number of communications devices across various communication cells. Similarly, the terrestrial radio network part of the terrestrial wireless communications network 210 may comprise a plurality of base stations serving a larger number of communications devices across various communication cells. However, only a single terrestrial base station, single non-terrestrial network part, single non-terrestrial base station and single communications device are shown in FIG. 3 in the interests of simplicity.

As with a conventional mobile radio network, the communications device 208 is arranged to communicate data to and from the non-terrestrial base station (transceiver station) 101. The non-terrestrial base station 101 is in turn communicatively connected to a serving gateway, S-GW, 130 in the core network part 102 which is arranged to perform routing and management of mobile communications services to the communications device 208 in the wireless telecommunications system 200 via the non-terrestrial base station 101. The functions of the core network parts 102, 112 may be carried out by one or more core network entities.

For example, in order to maintain mobility management and connectivity, the core network part 102 also includes a mobility management entity (MME) 132 which manages the enhanced packet service (EPS) connections with the communications device 208 operating in the communications system based on subscriber information stored in a home subscriber server (HSS). Other network components in the core network (not shown for simplicity) include a policy charging and resource function (PCRF) and a packet data network gateway (PDN-GW) which provides a connection from the core network part 102 to an external packet data network, for example the Internet. The core network part 112 of the terrestrial wireless communications network 210 may be similarly configured and may comprise an S-GW 134 and MME 136.

Each core network entity (including the MMEs 132, 136 and S-GWs 130, 134) may comprise transceiver circuitry (which may also be referred to as a transceiver/transceiver unit) for transmission and reception of signals and processor circuitry (which may also be referred to as a processor/processor unit) configured to control the core network entity (132, 136, 130, 134) to operate in accordance with embodiments of the present disclosure as described herein.

As noted above, the operation of the various elements of the non-terrestrial wireless telecommunications system 200 and terrestrial wireless telecommunications system 210 shown in FIG. 3 may be broadly conventional apart from where modified to provide functionality in accordance with embodiments of the present disclosure as discussed herein.

Figure 4:
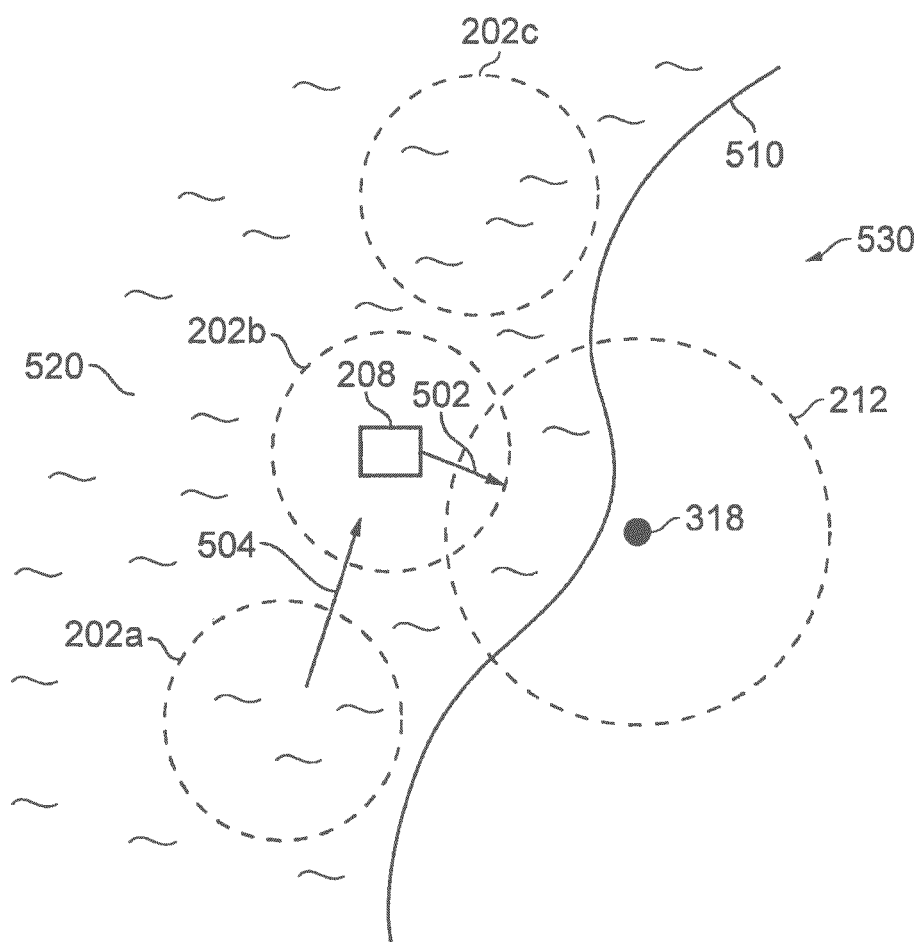
FIG. 4 illustrates a scenario in which embodiments of the present technique may be applicable.

FIG. 4 illustrates a scenario in which embodiments of the present technique may be applicable. FIG. 4 shows, in plan view, a region comprising a land portion 530 and a sea portion 520, separated by a coastline 510. The terrestrial base station/infrastructure equipment 318 is located on the land portion 530, generating the terrestrial cell 212 whose coverage area extends over the sea portion 520.

The coverage area of the non-terrestrial cell 202, generated by the non-terrestrial network part 308 (which is not shown for clarity) is shown for the case where the cell 202 moves with respect to the surface of the Earth over time (for example, because the non-terrestrial network part 308 is in a non-geostationary earth orbit). Thus, over time, the coverage area of the cell may move from a first region 202a, to a second region 202b, to a third region 202c, and so on, as indicated by the arrow 504. A portion of the second region 202b overlaps with the terrestrial cell 212.

In some embodiments, the non-terrestrial network part 308 may generate a cell 202 which is substantially stationary with respect to the surface of the earth; for example, in such a case the coverage region of the cell 202 may correspond to the region 202b of FIG. 4 and may be substantially invariant over time.

The communications device 208 is located within the coverage region 202b; for example, the communications device 208 may be located on a ship, which is traveling towards the land portion 510 in the direction indicated by the arrow 502.

Because of the overlap of the coverage regions of the non-terrestrial cell 202b and the terrestrial cell 212, it may be desirable that the communications device 208, when within the coverage of the non-terrestrial cell 202b and being served by the non-terrestrial network part 308, performs measurements of signals transmitted by the terrestrial network part/base station 318, in order to enable a change of serving cell to the terrestrial cell 212 if the communications device 208 is in fact within the coverage region of the terrestrial cell 212.

Figure 5:
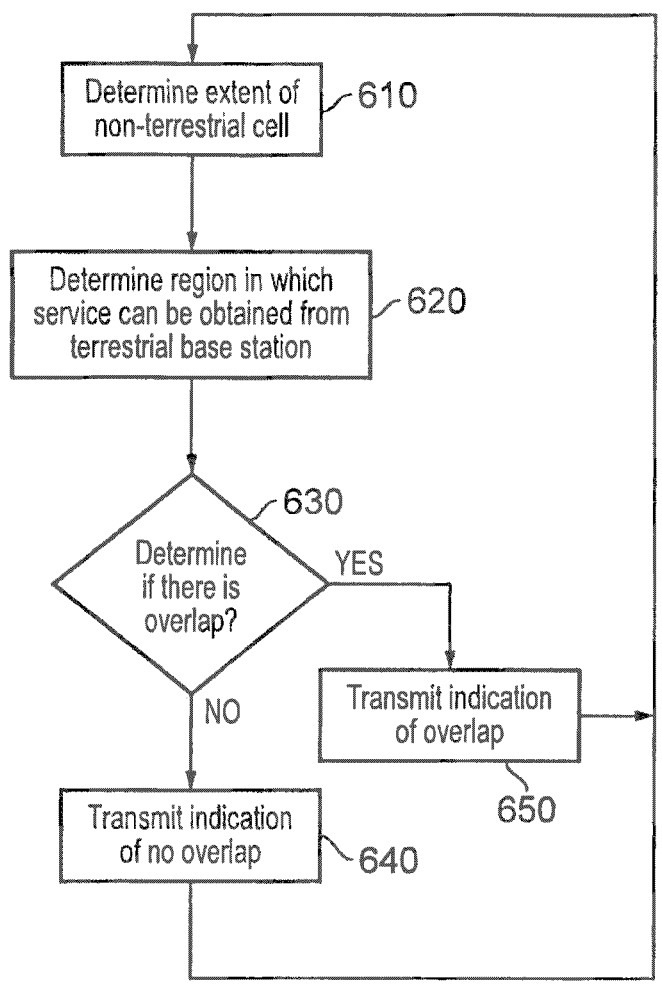
FIG. 5 illustrates a flow chart for a process in accordance with embodiments of the present technique.

FIG. 5 illustrates a flow chart for a process in accordance with embodiments of the present technique, which may be carried out by the non-terrestrial part 308 either alone or in conjunction with one or more other entities in the wireless communications network (such as the ground station/non-terrestrial base station 101 of FIG. 3).

The process starts at step 610 in which a region of the surface of the Earth (which may include airspace above that region) is determined which corresponds to the extent of the serving cell 202. That is, the region in which service may be obtained by communications devices in the serving cell 202 is determined. This may be, for example, based on known data about the orbit or path of the non-terrestrial part 308.

At step 620, a region of the surface of the Earth (which may include airspace above that region) is determined based on at least a coverage area of one or more non-serving cells. The region associated with the coverage area of the non-serving cell(s) may correspond to the coverage area of the one or more non-serving cells (i.e. the area in which a communications device may obtain service from infrastructure equipment generating the respective non-serving cell(s)), or may be larger than or smaller than the coverage area of the one or more non-serving cells.

For example, it may be preferable that a communications device (such as the communications device 208) initiates measurements of signals transmitted in the non-serving cell, even when it is not within the coverage area of the non-serving cell and thus cannot successfully transmit or receive data in the non-serving cell. In such a case, the determined region may be larger than the coverage area of the non-serving cell, for example, extending radially from the infrastructure equipment generating the respective non-serving cell to a distance which exceeds the respective radius of the coverage area by a predetermined factor.

Alternatively, the determined region may be a subset of the coverage area of the one or more serving cells, in order to avoid causing the communications device 208 to initiate measurements of a cell while located close to an edge of the coverage region of the non-serving cell(s).

In some embodiments, the one or more non-serving cells may be limited to terrestrial cells, i.e. those generated by terrestrial infrastructure equipment/base stations. In some embodiments, the one or more non-serving cells may be limited to those terrestrial cells generated by terrestrial infrastructure equipment/base stations which form a part of the wireless communications network which includes the non-terrestrial network part 308. Alternatively or additionally, only non-serving cells are considered if they are generated by terrestrial infrastructure equipment operated by an operator having a commercial arrangement (e.g. a roaming agreement) with the operator of the wireless communications network which includes the non-terrestrial network part 308.

The one or more non-serving cells may be or comprise the terrestrial cell 212 generated by the terrestrial base station 318.

Additionally or alternatively, only terrestrial cells in a border region (i.e. where contiguous terrestrial coverage may end, such as in the region of the coastline 510) of FIG. 4, may be considered.

Additionally or alternatively, only terrestrial cells providing 'macro' coverage (e.g. where service is available over a large distance from the infrastructure equipment generating the respective cell e.g. over 1 kilometre) may be considered.

As such, it will be readily apparent that the extent of terrestrial coverage which is considered in step 620 need not be exhaustive.

In the following description, only a single non-serving cell (the terrestrial cell 212) is considered, and the region associated with the coverage of the terrestrial cell 212 is considered to correspond to the coverage region of the terrestrial cell 212; however, as described above, the coverage region of two or more non-serving cells may be determined, and the determined region may not correspond to the respective coverage region(s) of the non-serving cell(s).

At step 630, it is determined whether there is any overlap between the cell 202 and the determined region associated with the coverage area of the non-serving cell 212, based on the outcome of the determinations in step 610 and step 620.

The determination in step 630 (and corresponding update to any indication) may be for a time in the near future (e.g.

for some predetermined number of seconds in the future) so that communications devices can initiate measurements of the terrestrial communications network in sufficient time to trigger a mobility procedure and/or to avoid starting measurements if there is a low probability that criteria for a mobility procedure will be satisfied while a (present) overlap exists.

In response to determining that there is an overlap (which may be required to exceed a threshold amount of area) between the cell 202 and the determined region, the non-terrestrial part 308 may transmit in step 650 an indication that the non-terrestrial cell 202 overlaps with a region associated with one or more terrestrial cells, such as the terrestrial cell 212.

In some embodiments, the indication does not identify the one or more terrestrial cells.

Examples of how the indication may be transmitted are provided below.

Alternatively, in response to determining that there is no overlap (or there is determined to be an overlap which does not meet a threshold requirement), then in step 640 the non-terrestrial part 308 may transmit an indication that the non-terrestrial cell 202 does not overlap with a region associated with the coverage area of a terrestrial cell, such as the terrestrial cell 212. This indication may be implicit, for example, by ceasing to transmit the indication which has been, or would have been, transmitted in step 650.

The process then returns to step 610.

As will be readily appreciated, the steps of FIG. 5 may be performed in a different order, and/or one or more steps may be omitted. For example, step 640 may be omitted.

As an alternative to the process of FIG. 5, time periods when an overlap with terrestrial coverage will occur may be determined in advance, and a schedule may be determined, according to which steps 640 and 650 may be carried out.

Figure 6:
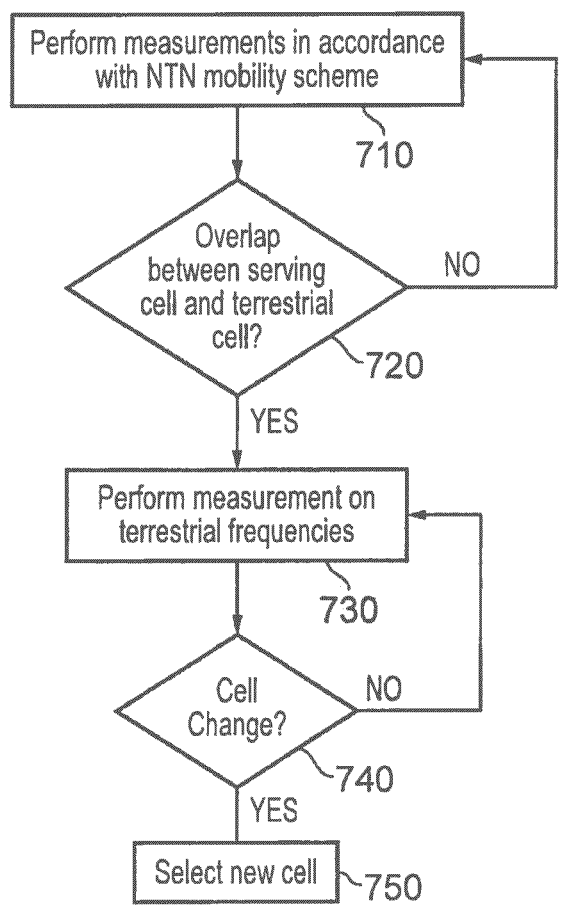
FIG. 6 illustrates a flow chart for a process which may be carried out by a communications device in accordance with embodiments of the present technique.

FIG. 6 illustrates a flow chart for a process carried out by the communications device 208 in accordance with embodiments of the present technique.

The process starts at step 710, in which the communications device 208 is served by the non-terrestrial network part 308 in the non-terrestrial cell 202. That is, the non-terrestrial cell 202 is the serving cell of the communications device 208; the communications device 208 may be in an idle mode, a connected mode, or an inactive mode.

In step 710, the communications device 208 may perform measurements or transmissions in accordance with a mobility scheme in which the communications device 208 refrains from measuring signals transmitted by the infrastructure equipment associated with the one or more non-serving cells.

For example, where the determination in step 620 is made in respect only of terrestrial non-serving cells, then in step 710, the communications device 208 may perform measurements or transmissions in accordance with a non-terrestrial network (NTN) mobility scheme. The non-terrestrial network mobility scheme may reduce power consumption of the communications device 208 by performing steps necessary to support possible mobility (i.e. cell change) to another non-terrestrial cell, but not performing steps which would enable possible mobility to another terrestrial cell. For example, no measurements may be made on frequencies other than those used by non-terrestrial network parts.

In some embodiments, in accordance with the non-terrestrial network mobility scheme, no signal measurements are performed for the purposes of mobility.

In some embodiments, in accordance with the non-terrestrial network mobility scheme, the communications device 208 transmits periodically to the non-terrestrial network part 308 so that the non-terrestrial network part 308 may determine a location of the communications device 208. The periodic transmissions may comprise an indication of location (e.g. determined by the communications device 208 based on a satellite positioning technique), and/or may comprise uplink reference signals, which may be measured by the non-terrestrial network part 308.

In some embodiments, in accordance with the non-terrestrial network mobility scheme, the communications device 208 performs measurements only of signals which are transmitted using a same frequency, or are within a same frequency band, as that used by the non-terrestrial network part 308.

While in step 710, the communications device 208 may thus change serving cell, from one non-terrestrial cell to another.

In step 720, the communications device 208 determines whether there is an overlap between the coverage of the serving cell 202 and a region associated with a coverage area of one or more cells of a particular type. The type may correspond to the type(s) of cells whose coverage region forms the basis for the determination of the region determined in step 620, as described above.

In the following description, the determination by the communications device 208 is made in respect of terrestrial cells, as will be further described herein.

Step 720 may be performed in response to a particular trigger event. For example, it may be performed in response to a cell change or to receipt of an indication from the non-terrestrial network part 308.

If the communications device 208 determines at step 720 that there is no such overlap between the coverage of the serving cell 202 and any region associated with a terrestrial cell (or fails to determine that there is such an overlap), control returns to step 710.

If, in step 720, the communications device 208 determines that there is an overlap between the coverage of the serving cell 202 and a region associated with a coverage area of one or more terrestrial cells, then control passes to step 730.

In step 730, the communications device 208 performs measurements of signals transmitted on one or more frequencies used by the infrastructure equipment associated with the type of cells to be measured. Where the type of cells are terrestrial cells, these frequencies may be referred to as 'terrestrial frequencies'. The terrestrial frequencies may be pre-configured in the communications device 208 (e.g. by a home network operator), indicated as such in the system information of the non-terrestrial cell 202, configured by the non-terrestrial cell 202 using a measurement object configuration or determined in some other manner.

The communications device 208 may initiate a cell search, which may be broadly based on conventional principles. For example, a search may be made within the signals transmitted using the terrestrial frequencies, received by the communications device 208, for a primary synchronization sequence (PSS) and a secondary synchronization sequence (SSS). If such a search is successful, the communications device 208 may receive and decode system information (which may comprise a master information block and one or more system information blocks) associated with one or more of the non-serving cells, such as the terrestrial cell 212.

Measurements of the terrestrial frequencies may comprise determining one or more of a received signal strength, a level of interference, a signal-to-noise ratio (SNR), a signal-to-interference-plus-noise ratio (SINR), a received signal code power (RSCP), a received chip energy divided to noise spectral density ratio (Ec/No) and a reference signal receive quality (RSRQ).

In some embodiments, results of the measurements may be transmitted to the non-terrestrial network part 308.

In step 750, the communications device 208 determines whether a cell change is to occur, and if so, to which new cell.

In response to receiving the measurement results, the non-terrestrial network part 308 (or any other part of the wireless communications network 200) may determine that a cell change is appropriate, and may initiate a network-controlled mobility procedure (e.g. handover or cell change order). The communications device 208 may determine that a cell change is to occur based on receiving an indication of network-controlled mobility from the non-terrestrial network part 308.

In some embodiments, in step 750, the communications device 208 may compare the results of the measurements of the terrestrial frequencies to criteria associated with a mobile device-controlled mobility procedure, such as a cell selection/reselection. The criteria may comprise thresholds which are pre-determined and/or may be indicated in the system information of the non-terrestrial cell 202 or in the system information newly received in the terrestrial cell. If the results of the measurements satisfy the criteria, the communications device 208 may initiate the mobile device-controlled mobility procedure.

If in step 750 the communications device 208 determines that a cell change is to occur (e.g. either a network-controlled mobility procedure or a mobile device-controlled mobility procedure is to be initiated), then control passes to step 740, in which the communications device 208 sets as its serving cell a new cell (which may be the terrestrial cell 212). The communications device 208 may establish a radio (e.g. radio resource control, RRC) connection with the terrestrial base station 318 in the terrestrial cell 212, and may transmit a request to register in the non-terrestrial wireless communications network 210. The request may comprise a tracking area update or other appropriate non-access stratum (core network) registration procedure.

According to some embodiments of the present technique, the non-terrestrial part 308 transmits, in steps 640 and 650, system information associated with the non-terrestrial cell 202 comprising an indication of whether or not the non-terrestrial cell 202 overlaps with a region associated with a coverage region of a terrestrial cell, such as the terrestrial cell 212. The indication may comprise a single bit in the system information. The indication may comprise an 'overlapped with terrestrial cellular' indication, which may be a boolean indication (i.e. true or false), which may be set to 'true' if an overlap exists.

Preferably, the indication may form part of a minimum system information, such as that contained within a master information block, or a system information block 1.

As such, if the non-terrestrial cell 202 generated by the non-terrestrial network part 308 moves with respect to the surface of the Earth, the indication in the system information may be modified, so that in step 640 of FIG. 5, when the cell 202 does not overlap with the region associated with the terrestrial cell (e.g. when the coverage region of the spot beam of the non-terrestrial network part is as shown by regions 202a or 202c of FIG. 4), the indication is not present, or indicates that there is no overlap between the coverage of the non-terrestrial cell 202 and a region associated with a terrestrial cell.

In step 650 of FIG. 5, when the cell 202 does overlap with a region associated with a terrestrial cell (e.g. when the coverage region of the spot beam of the non-terrestrial network part is as shown by region 202b of FIG. 4), the indication is present, and indicates that there is an overlap between the coverage of the non-terrestrial cell 202 and a region associated with a terrestrial cell.

If the system information changes, then a paging message may be transmitted to indicate that the system information has been modified.

The communications device 208 may thus initially (e.g. in step 710 of FIG. 6) receive system information from the non-terrestrial network part 308 indicating that there is no overlap with a region associated with a terrestrial cell (e.g. when the coverage of the non-terrestrial cell corresponds to 202a). Subsequently, the communications device 208 may receive updated system information (e.g. in response to receiving the paging message comprising an indication that the system information has been modified, or in response to changing serving cell) indicating that there is an overlap.

In step 720 of FIG. 6, therefore, the communications device 208 may determine whether or not there is any overlap between the serving cell 202 and a region associated with any terrestrial cell based on a most recently received system information transmitted by the non-terrestrial network part 308, associated with the serving cell 202. More specifically, the determination may be based on the value of the 'overlapped with terrestrial cellular' indication.

The transmission of an indication within system information provides an efficient means of indicating to the communications device 208 whether or not there is an overlap with terrestrial cells or a region associated with terrestrial cells. Since the system information need only be read if necessary by the communications device, and can be broadcast by the non-terrestrial network part 308, communications resources and decoding and receiving processing can be accordingly minimized.

The transmission of an indication within system information is particularly suited where the non-terrestrial network part 308 is in a geo-stationary orbit, such that the 'overlapped with terrestrial cellular' indication does not change over time, since the communications device 208 must acquire (i.e. receive and decode) the system information for the cell 202 in any case.

In some embodiments, the 'overlapped with terrestrial cellular' indication, or an indication of its change (with respect to, for example the value indicated by recently transmitted system information) is transmitted within a paging message. Conventionally, all communications devices within a cell are required to monitor and decode paging messages which may be transmitted on certain paging occasions in accordance with a pre-determined schedule, in order to determine whether communications resources have been (or will be) allocated for the purposes of transmitting downlink data (i.e. data from the core network to the communications device).

Preferably, one or more paging messages are transmitted in step 650 of FIG. 5 so that all communications devices are notified of a change in the 'overlapped with terrestrial cellular' indication. This may be by transmitting the 'overlapped with terrestrial cellular' indication within the paging message(s). In order to ensure that all communications devices in the cell 202 receive the updated indication, a paging message including the updated 'overlapped with terrestrial cellular' indication may be transmitted on all paging occasions within a time period.

The presence of the 'overlapped with terrestrial cellular' indication in a paging message may indicate that there is an overlap of the cell 202 with a region associated with a terrestrial cell. Alternatively, the 'overlapped with terrestrial cellular' indication in a paging message may indicate explicitly whether or not there is an overlap of the cell 202 with a terrestrial cell.

In some embodiments, a paging message including the 'overlapped with terrestrial cellular' indication is transmitted continuously, on all paging occasions, for as long as there is an overlap between the cell 202 and a terrestrial cell.

In some embodiments, the 'overlapped with terrestrial cellular' indication is transmitted in system information, as described above. Paging messages may be transmitted if the state of that indication is changed (or, in some embodiments, only if it changes from indicating no overlap to indicating that there is an overlap).

The use of paging messages to inform communications devices of an overlap avoids the need for a communications device 208 to re-acquire system information, the vast majority of which may not have changed.

The use of paging messages is thus suitable in particular where the non-terrestrial network part 308 is not in a geo-stationary earth orbit, such that the 'overlapped with terrestrial cellular' indication may change over time.

In some embodiments, the non-terrestrial network part 308 may transmit an indication (such as the 'overlapped with terrestrial cellular' indication described above) directed to a particular communications device, such as the communications device 208, i.e. using a non-broadcast, non-multicast, transmission. In such embodiments, this may be in response to a determination that not only does a portion of the cell 202 overlap with a region associated with a coverage region provided by a terrestrial cell, but also that the location of the communications device 208 is within the overlapping region.

If, for example, in step 710 of FIG. 6 the communications device 208 transmits periodic location reports to the non-terrestrial network part 308, then these may be forwarded to the non-terrestrial base station 101. The non-terrestrial base station 101 may perform the determinations in steps 610 and 620 described above and may further determine that the location of the communications device 208 is within the overlapping region.

Figure 7:
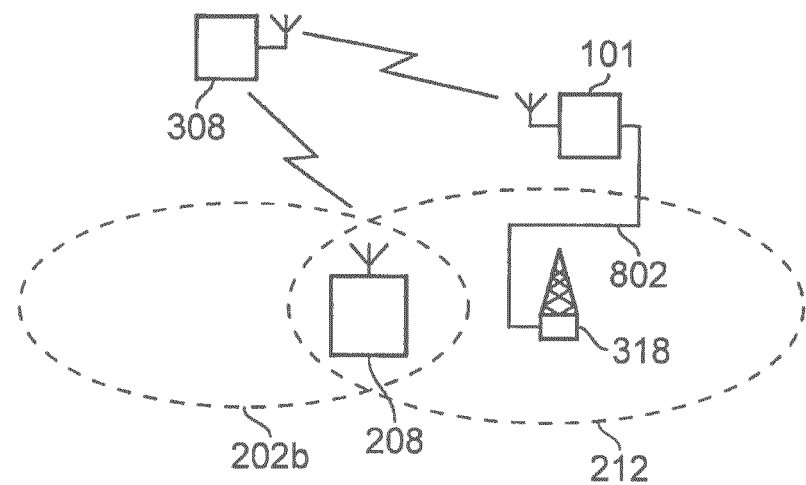
FIG. 7 schematically represents a configuration of the wireless telecommunication systems of FIG. 3 in accordance with embodiments of the present disclosure.

FIG. 7 schematically shows the terrestrial and non-terrestrial wireless telecommunications systems 200, 210 of FIG. 3 in a configuration where the coverage region of the cell generated by a spot-beam of the non-terrestrial part 308 is the region 202b of FIG. 4. Furthermore, the communications device 208 is located within both the region 202b corresponding to the non-terrestrial cell 202 and within the coverage region of the terrestrial cell 212.

In the configuration illustrated in FIG. 7, the non-terrestrial base station 101 and the terrestrial base station (infrastructure equipment) 318 are connected via an inter-base station interface 802, however it will be appreciated that this interface need not be present in some embodiments. For clarity the core network parts 102, 112 are omitted.

Figure 8:
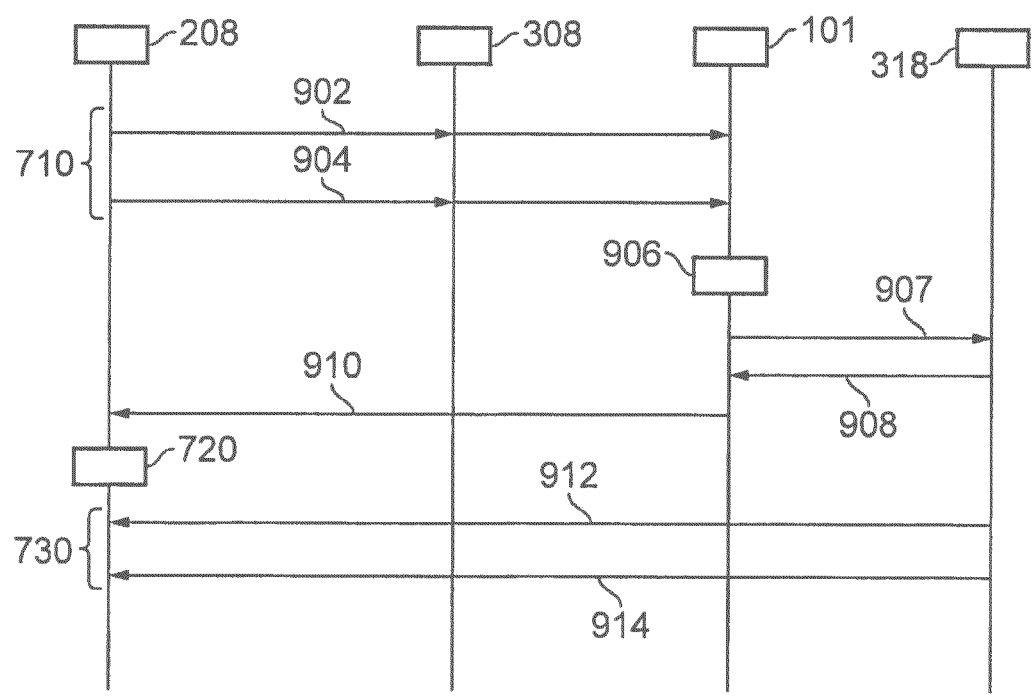
FIG. 8 illustrates a message sequence and process chart in accordance with embodiments of the present technique.

FIG. 8 illustrates a message sequence and process chart in accordance with embodiments of the present technique, which is described with reference to the configuration illustrated in FIG. 7.

Initially, the communications device 208 is located within the coverage region of the non-terrestrial cell 202 and is served by the non-terrestrial network part 308 and the non-terrestrial base station 101. In accordance with step 710 described above, the communications device 208 may not be performing measurements of signals transmitted by the terrestrial base station 318. As described above in respect of step 710, the communications device 208 periodically determines its location and reports these in location reports 902, 904, which are transmitted to the non-terrestrial base station 101.

At step 906, the non-terrestrial base station 101 determines that the communications device 208 is within a region where the coverage of the non-terrestrial cell 202 generated by the non-terrestrial network part 308 and the coverage of the terrestrial cell 212 generated by the terrestrial base station 318 overlap. (In this example, the region associated with the coverage of the terrestrial cell 212 is the region of the coverage of the terrestrial cell 212).

In response to this determination, the non-terrestrial base station 101 transmits, via the non-terrestrial network part 308, a frequency indication, such as a terrestrial frequency indication 910 to the communications device 208 that it should initiate measurements on a terrestrial frequency.

Preferably, the terrestrial frequency indication 910 includes an indication of the particular frequency or frequencies on which the communications device 208 should initiate measurements. Further, the terrestrial frequency indication 910 preferably includes assistance information regarding the transmissions of the terrestrial base station 318 to assist the communications device 208 in identifying (and hence measuring) signals transmitted by the terrestrial base station 318.

The terrestrial frequency indication 910 may comprise an RRC Reconfiguration Command message, which may include measurement configuration information associated with the terrestrial cell 212. The terrestrial frequency indication 910 may comprise an indication of a measurement object associated with the terrestrial cell 212 and an indication of measurement gaps to be used by the communications device 208 to perform the measurements of the signals transmitted in the terrestrial cell 212.

Based on the terrestrial frequency indication 910, the communications device 208 thus determines that there is an overlap between the coverage of the serving cell 202 and a region associated with a terrestrial cell i.e. broadly corresponding to step 720 described above (if it has not already determined it by other means) and that the communications device 208 is within the region of overlap.

In response to receiving the terrestrial frequency indication 910, the communications device 208 initiates measurements of signals 912, 914 transmitted by the terrestrial base station 318 in the terrestrial cell 212, in accordance with the contents of the indication. Thus, the communications device 208 performs step 730 described above.

The non-terrestrial base station 101 may be pre-configured with the information associated with the cell 212 in order to generate the terrestrial frequency indication 910 containing information associated with the cell 212. Alternatively the non-terrestrial base station 101 may obtain the information from a remote database (not shown).

Alternatively, the non-terrestrial base station 101 may obtain the information from the terrestrial base station 318. The non-terrestrial base station 101 may transmit a request for terrestrial cell information 907 and in response, may receive a terrestrial cell information indication 908, transmitted from the terrestrial base station 318 to the non-terrestrial base station 101. The terrestrial cell information indication 908 may comprise one or more of the measurement information or a description of the measurements object associated with the terrestrial cell 212. The request for terrestrial cell information 907 and the terrestrial cell information indication 908 may be transmitted either directly via the inter-base station interface 802 or indirectly (e.g. via the core network parts 102, 112).

Conventionally, a wireless communications network may be associated with an identity, such as a public land mobile network (PLMN) identity. For example, each of the non-terrestrial wireless telecommunications system 200 and the terrestrial wireless telecommunications system 210 may be associated with (different) PLMN identities.

Within a wireless communications network, a group of cells may be organised into a group, which may be referred to as a tracking area. A tracking area identity (TAI) associated with the tracking area may be transmitted in the system information of each cell within the tracking area. Communications devices may register with the wireless communications networks 200, 210 using a tracking area update process, so that the core network 102, 112 is aware of which tracking area the communications device is within. The tracking area update may be initiated periodically, or whenever a communications device changes its serving cell to one in a tracking area in which it is not registered (e.g. having a TAI different from a TAI in which it most recently performed a tracking area update procedure).

The tracking area update process may comprise the transmission of a tracking area update request message by the communications device 208 to an entity (e.g. the mobility management entity 132) of the core network part 102 of the non-terrestrial wireless communications network 200.

For example, when the communications device 208 first selects the non-terrestrial cell 202 as its serving cell then, if the TAI associated with the non-terrestrial cell 202 is different from the previously-registered TAI, the communications device 208 may transmit a tracking area update request, indicating the tracking area identity associated with the non-terrestrial cell 202, to the core network part 102 of the non-terrestrial wireless communications network 200.

In response, a tracking area update accept message may be transmitted by the core network part 102 (e.g. by the mobility management entity).

The tracking area update accept message may include a list of equivalent public land mobile network (PLMN) identities, that is, identities of networks whose cells are to be treated (for mobility management purposes) as belonging to the current serving wireless communications network.

In some embodiments, the non-terrestrial wireless communications network 200 may transmit to the communications device 208 an indication that an identity of the non-terrestrial communications network 200 is equivalent to an identity of the terrestrial communications network 210, if at least a portion of a region in which the communication device 208 is located overlaps with a region associated with one or more terrestrial cells, such as the terrestrial cell 212.

The indication that the identity of the non-terrestrial communications network 200 is equivalent to an identity of the terrestrial communications network 210 may comprise a list of one or more equivalent PLMN IDs which includes a PLMN ID associated with the terrestrial communications network 210.

The indication that the identity of the non-terrestrial communications network 200 is equivalent to an identity of the terrestrial communications network 210 may be transmitted if at least a portion of a tracking area in which the communication device 208 is located overlaps with a region associated with one or more terrestrial cells, such as the terrestrial cell 212. In this case, instead of being cell-specific, the indication of overlap may be applicable across the tracking area (which may comprise multiple cells) comprising the non-terrestrial cell 202; in other words, the indication of overlap (i.e. the indication of the equivalence of identities) informs the communications device 208 that a portion of one or more cells in the same tracking area as the non-terrestrial cell 202 overlaps with a region based on the coverage of the terrestrial network.

In some embodiments, in response to receiving from the communications device 208 a tracking area update request, the tracking area update request identifying a tracking area including a non-terrestrial cell 202 generated by the non-terrestrial network part 318, the MME 132 may determine whether the coverage area of the cells in the identified tracking area overlaps with a region associated with a coverage area of at least one terrestrial cell, such as the terrestrial cell 202

If the MME 132 determines that the coverage area of the non-terrestrial cells in the tracking area overlaps with the region associated with the coverage area of the at least one terrestrial cell, it may transmit to the communications device 208 a response to the tracking area update request (e.g. a tracking area update response), the response indicating that an identity (e.g. the PLMN ID) of the non-terrestrial wireless communications network 202 is equivalent to an identity (e.g. the PLMN ID) of another wireless communications network, such as the terrestrial wireless communications network 210 which includes the terrestrial base station 101 generating the terrestrial cell 202.

The communications device 208, receiving the indication that the identity of the communications network 200 is equivalent to that of another network (in the example of FIGS. 3 and 8, of terrestrial communications network 210) may in response initiate measurements using the terrestrial frequencies.

The communications device 208 may be pre-configured with, or may otherwise determine, a correspondence between the identity indicated in the equivalent PLMN list (in this case, of the terrestrial network 210) and the one or more terrestrial frequencies on which measurements should be made. This may reduce the amount of 'blind' searching performed by the communications device, and may speed up the search (and possibly cell change) process.

In some embodiments where the non-terrestrial network part 308 is in a geo-stationary earth orbit, tracking areas may be configured by the operator of the non-terrestrial network 200 such that a plurality of cells covering a region where terrestrial network coverage finishes (e.g. along coasts) are grouped into one tracking area and a plurality of cells covering a region where terrestrial network coverage starts are grouped into another tracking area, the tracking area including substantially only cells where at least some portion of the respective cell coverage region overlaps with a coverage region of the terrestrial network 210.

In further embodiments, the indication of an overlap of terrestrial and non-terrestrial coverage comprises a combination of the inclusion of a PLMN ID of a terrestrial network in the equivalent PLMN list, as described above, and a cell-specific indication. The cell-specific indication may comprise the 'overlapped with terrestrial cellular' indication, described above, transmitted either in the system information associated with the non-terrestrial cell 202, or in a paging message.

In some embodiments, in step 720 of FIG. 6, the determination as to whether or not there is an overlap between the coverage of the serving cell 202 and a region associated with any terrestrial cell is based on a determination by the communications device 208 of its location. The determination of overlap therefore comprises a step of determining a location of the communications device 208, for example based on satellite positioning techniques (which may include the use of assistance data transmitted by the non-terrestrial network part 308).

The communications device 208 may then determine whether its location is within a region associated with the coverage of the terrestrial network.

The region may be predefined. The region may each be characterised by a centre and radius of a circle. Alternatively, the communications device 208 may be pre-configured with information for each of a plurality of zones, the information indicating whether or not there is an overlap of terrestrial coverage and non-terrestrial coverage within the zone. Zones may be defined as a portion of a projection of the surface of the earth, such as based on the universal transverse Mercator projection.

The predefined region and/or information for each zone may be pre-configured in the communications device, for example it may be stored in a subscriber identity module (SIM) application, or in a non-volatile memory of the communications device 208. Additionally or alternatively, the predefined region and/or information for each zone may be transmitted to the communications device as part of a NAS registration procedure.

Embodiments where the communications device 208 determines autonomously whether or not it is in a region where terrestrial and non-terrestrial coverage may overlap may thus avoid the need for specific signalling by the non-terrestrial network part 308 to indicate that overlap has arisen or may arise in respect of the particular cell 202. Such embodiments may therefore provide particular benefits where the non-terrestrial network part 308 is not in a geo-stationary orbit or where the coverage region of the cell 202 may otherwise vary significantly over time.

In some embodiments, one or more of the above techniques may be combined. For example, based on receiving the indication that the identity of the non-terrestrial wireless communications network 200 is equivalent to that of another network, the communications device 208 may determine, based on pre-configured information providing a correspondence between the identity of the other network and one or more terrestrial frequencies used by the other network.

The communications device 208 may, however, initiate measurements of signals transmitted on the terrestrial frequencies only in response to an indication in a paging message or in a system information message associated with the serving cell 202 that there is an overlap in coverage of the serving cell 202 and the coverage of the other (terrestrial) network 210.

Thus there has been described a method for method for a communications device in a coverage region of a first cell generated by a non-terrestrial network part of a wireless communications network, the first cell being a serving cell for the communications device, the method comprising determining whether the coverage area of the first cell overlaps with a region associated with a coverage area of at least one non-serving cell, and in response to determining that the coverage area of the serving cell overlaps with a region associated with a coverage area of at least one non-serving cell, initiating measurements of signals transmitted on a frequency which is used for transmissions by infrastructure equipment associated with the at least one non-serving cell.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/ predefined in the sense of being known by both the base stations and the communications device. It will be appreciated such predetermined/predefined information may in general be established, for example, by definition in an operating standard for the wireless telecommunication system, or in previously exchanged signalling between the base stations and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein.

It may further be noted various example approaches discussed herein rely on information which is exchanged/ communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device or terminal device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system or systems that support mobility between a cell generated by a non-terrestrial network part and a cell generated by a terrestrial base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for a communications device in a coverage region of a first cell generated by a non-terrestrial network part of a wireless communications network, the first cell being a serving cell for the communications device, the method comprising:

determining whether the coverage area of the first cell overlaps with a region associated with a coverage area of at least one non-serving cell, and in response to determining that the coverage area of the serving cell overlaps with a region associated with a coverage area of at least one non-serving cell, initiating measurements of signals transmitted on a frequency which is used for transmissions by infrastructure equipment associated with the at least one non-serving cell.

Paragraph 2. A method according to paragraph 1, wherein each of the at least one non-serving cells is a terrestrial cell and the determining whether the coverage area of the first cell overlaps with a region associated with a coverage area of at least one non-serving cell comprises determining whether the coverage area of the first cell overlaps with a region associated with a coverage area of at least one non-serving terrestrial cell.

Paragraph 3. A method according to paragraph 1 or paragraph 2, the method comprising:

prior to the determining, performing measurements and transmissions in accordance with a non-terrestrial network mobility scheme.

4. A method according to paragraph 3 wherein, in accordance with the non-terrestrial network part mobility scheme, the communications device periodically transmits uplink reference symbols to the non-terrestrial network part.

Paragraph 5. A method according to paragraph 3 or paragraph 4 wherein, in accordance with the non-terrestrial network part mobility scheme, the communications device periodically determines a location of the communications device and transmits an indication of the location of the communications device to the non-terrestrial network part.

Paragraph 6. A method according to any of paragraphs 3 to 5 wherein, in accordance with the non-terrestrial network part mobility scheme, the communications device refrains from measuring signals transmitted on frequencies not used by one or more non-terrestrial network parts.

Paragraph 7. A method according to any of paragraphs 3 to 6 wherein, in accordance with the non-terrestrial network part mobility scheme, the communications device measures signals transmitted only on frequencies used by one or more non-terrestrial network parts.

Paragraph 8. A method according to any of paragraphs 1 to 7 wherein determining whether the coverage area of the first cell overlaps with a region associated with a coverage area of the at least one non-serving cell comprises:

receiving a paging message transmitted by the non-terrestrial network part, the paging message comprising an indication that at least a portion of the coverage region of the serving cell is within a region associated with a coverage area of a cell generated by one or more terrestrial infrastructure equipment.

Paragraph 9. A method according to any of paragraphs 1 to 8 wherein determining whether the coverage area of the first cell overlaps with a region associated with a coverage area of at least one non-serving cell comprises:

receiving a system information message transmitted by the non-terrestrial network part, the system information message comprising an indication that at least a portion of the coverage region of the serving cell is within a region associated with a coverage area of a cell generated by one or more terrestrial infrastructure equipment.

Paragraph 10. A method according to any of paragraphs 1 to 9 wherein determining whether the coverage area of the first cell overlaps with a region associated with a coverage area of at least one non-serving cell comprises:

receiving an indication transmitted by the non-terrestrial network part that an identity associated with the wireless communications network is equivalent to an identity associated with another wireless communications network, and the other wireless communications network comprises the infrastructure equipment associated with the at least one non-serving terrestrial cell.

Paragraph 11. A method according to any of paragraphs 1 to 10 wherein determining whether the coverage area of the first cell overlaps with a region associated with a coverage area of at least one non-serving cell comprises:

receiving a frequency indication transmitted by the non-terrestrial network part to the communications device, the frequency indication comprising an indication of the frequency which is used for transmissions by infrastructure equipment associated with the at least one non-serving cell.

Paragraph 12. A method according to any of paragraphs 1 to 11 wherein determining whether the coverage area of the first cell overlaps with a region associated with a coverage area of at least one non-serving cell comprises:

determining a location of the communications device;

determining whether the location of the communications device is within a pre-determined region associated with the at least one non-serving cell.

Paragraph 13. A method according to any of paragraphs 1 to 12 wherein the coverage region of the serving cell is constantly moving with respect to the surface of the Earth.

Paragraph 14. A method according to any of paragraphs 1 to 12 wherein the coverage region of the serving cell is substantially invariant with respect to the surface of the Earth.

Paragraph 15. A method for an infrastructure equipment of a non-terrestrial wireless communications network, the non-terrestrial wireless communications network comprising a non-terrestrial network part and a non-terrestrial base station, the method comprising:

transmitting an indication in a non-terrestrial cell generated by the non-terrestrial network part that a coverage area of the non-terrestrial cell overlaps with a region associated with a coverage area of at least one cell generated by another infrastructure equipment.

Paragraph 16. A method according to paragraph 15, the method comprising:

determining whether the coverage area of the non-terrestrial cell overlaps with the region associated with the coverage area of the at least one cell generated by the other infrastructure equipment, wherein transmitting the indication is in response to determining that the coverage area of the non-terrestrial cell generated by the non-terrestrial network part overlaps with the region associated with the coverage area of at least one cell generated by another infrastructure equipment.

Paragraph 17. A method according to paragraph 15 or paragraph 16, wherein each of the at least one cell generated by another infrastructure equipment is a terrestrial cell generated by terrestrial infrastructure equipment, and the indication comprises an indication that the coverage area of the non-terrestrial cell generated by the non-terrestrial network part overlaps with a region associated with a coverage area of at least one terrestrial cell.

Paragraph 18. A method according to any of paragraphs 15 to 17, the method comprising:
   transmitting a paging message, the paging message including the indication.

Paragraph 19. A method according to any of paragraphs 15 to 18, the method comprising:
   transmitting a system information message, the system information message including the indication.

Paragraph 20. A method according to any of paragraphs 15 to 19, wherein the indication comprises an indication that an identity of the wireless communications network is equivalent to an identity of another wireless communications network, and
   the other wireless communications network comprises the other infrastructure equipment.

Paragraph 21. A method according to any of paragraphs 15 to 20, wherein the infrastructure equipment is the non-terrestrial base station.

Paragraph 22. A method according to any of paragraphs 15 to 20, wherein the infrastructure equipment is the non-terrestrial network part Paragraph 23. A method for a core network equipment of a wireless communications network, the wireless communications network comprising a non-terrestrial network part, the method comprising:
   receiving from a communications device a tracking area update request, the tracking area update request identifying a tracking area, the tracking area comprising a plurality of cells, the plurality of cells comprising one or more non-terrestrial cells generated by the non-terrestrial network part,
   determining whether the coverage area of the plurality of cells overlaps with a region associated with a coverage area of at least one terrestrial cell, and
   in response to determining that the coverage area of the one or more non-terrestrial cells overlaps with the region associated with the coverage area of the at least one terrestrial cell, transmitting to the communications device a response to the tracking area update request, the response indicating that an identity of the wireless communications network is equivalent to an identity of another wireless communications network, the other wireless communications network comprising infrastructure equipment for generating the at least one terrestrial cell.

Paragraph 24. A communications device for use in a wireless communications network, wherein the communications device comprises controller circuitry and transceiver circuitry configured such that when the terminal device is in a coverage region of a first cell generated by a non-terrestrial network part of a wireless communications network, the first cell being a serving cell for the communications device, the communications device is operable to:
   determine whether the coverage area of the first cell overlaps with a region associated with a coverage area of at least one non-serving cell, and
   in response to determining that the coverage area of the serving cell overlaps with a region associated with a coverage area of at least one non-serving cell, initiate measurements of signals transmitted on a frequency which is used for transmissions by infrastructure equipment associated with the at least one non-serving cell.

Paragraph 25. Integrated circuitry for a communications device for use in a wireless communications network, wherein the integrated circuitry comprises controller circuitry and transceiver circuitry configured to operate together such that when the terminal device is in a coverage region of a first cell generated by a non-terrestrial network part of a wireless communications network, the first cell being a serving cell for the communications device, the communications device is operable to:
   determine whether the coverage area of the first cell overlaps with a region associated with a coverage area of at least one non-serving cell, and
   in response to determining that the coverage area of the serving cell overlaps with a region associated with a coverage area of at least one non-serving cell, initiate measurements of signals transmitted on a frequency which is used for transmissions by infrastructure equipment associated with the at least one non-serving cell.

Paragraph 26. Infrastructure equipment of a non-terrestrial wireless communications network, the non-terrestrial wireless communications network comprising a non-terrestrial network part and a non-terrestrial base station, wherein the infrastructure equipment comprises controller circuitry and transceiver circuitry configured such that the infrastructure equipment is operable to:
   transmit an indication in a non-terrestrial cell generated by the non-terrestrial network part that a coverage area of the non-terrestrial cell overlaps with a region associated with a coverage area of at least one cell generated by another infrastructure equipment.

Paragraph 27. Integrated circuitry for infrastructure equipment of a non-terrestrial wireless communications network, the non-terrestrial wireless communications network comprising a non-terrestrial network part and a non-terrestrial base station, wherein the integrated circuitry comprises controller circuitry and transceiver circuitry configured to operate together such that the infrastructure equipment is operable to:
   transmit an indication in a non-terrestrial cell generated by the non-terrestrial network part that a coverage area of the non-terrestrial cell overlaps with a region associated with a coverage area of at least one cell generated by another infrastructure equipment.

Paragraph 28. Core network equipment of a wireless communications network, the wireless communications network comprising a non-terrestrial network part, wherein the core network equipment comprises controller circuitry and transceiver circuitry configured such that the core network equipment is operable to:
   receive from a communications device a tracking area update request, the tracking area update request identifying a tracking area, the tracking area comprising a plurality of cells, the plurality of cells comprising one or more non-terrestrial cells generated by the non-terrestrial network part,
   determine whether the coverage area of the plurality of cells overlaps with a region associated with a coverage area of at least one terrestrial cell, and
   in response to determining that the coverage area of the one or more non-terrestrial cells overlaps with the region associated with the coverage area of the at least one terrestrial cell, transmit to the communications device a response to the tracking area update request, the response indicating that an identity of the wireless communications network is equivalent to an identity of another wireless communications network, the other wireless communications network comprising infrastructure equipment for generating the at least one terrestrial cell.

Paragraph 29. Integrated circuitry for core network equipment of a wireless communications network, the wireless communications network comprising a non-terrestrial network part, wherein the integrated circuitry comprises controller circuitry and transceiver circuitry configured to operate together such that the core network equipment is operable to:

receive from a communications device a tracking area update request, the tracking area update request identifying a tracking area, the tracking area comprising a plurality of cells, the plurality of cells comprising one or more non-terrestrial cells generated by the non-terrestrial network part, determine whether the coverage area of the plurality of cells overlaps with a region associated with a coverage area of at least one terrestrial cell, and in response to determining that the coverage area of the one or more non-terrestrial cells overlaps with the region associated with the coverage area of the at least one terrestrial cell, transmit to the communications device a response to the tracking area update request, the response indicating that an identity of the wireless communications network is equivalent to an identity of another wireless communications network, the other wireless communications network comprising infrastructure equipment for generating the at least one terrestrial cell.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TR 38.811 "Study on New Radio (NR) to support non terrestrial networks (Release 15)", December 2017
[2] Holma H. and Toskala A, "LTE for UMTS OFDMA and SC-FDMA based radio access", John Wiley and Sons, 2009

What is claimed is:

1. A method for a communications device in a coverage region of a first cell generated by a non-terrestrial network part of a wireless communications network, the first cell being a serving cell for the communications device, the method comprising:
    determining whether the coverage area of the first cell overlaps with a region associated with a coverage area of at least one non-serving cell,
    in response to determining that the coverage area of the serving cell overlaps with a region associated with a coverage area of the at least one non-serving cell, initiating measurements of signals transmitted on a frequency which is used for transmissions by infrastructure equipment associated with the at least one non-serving cell, and
    in response to the measurement of the signals transmitted on the frequency which is used for transmissions by infrastructure equipment associated with the at least one non-serving cell, determining whether to change from the first cell as the serving cell to the at least one non-serving cell as the serving cell for the communication device or to keep the first cell as the serving cell for the communications device.

2. A method according to claim 1, wherein each of the at least one non-serving cells is a terrestrial cell and the determining whether the coverage area of the first cell overlaps with a region associated with a coverage area of at least one non-serving cell comprises determining whether the coverage area of the first cell overlaps with a region associated with a coverage area of at least one non-serving terrestrial cell.

3. A method according to claim 1, the method comprising:
    prior to the determining, performing measurements and transmissions in accordance with a non-terrestrial network mobility scheme.

4. A method according to claim 3, wherein, in accordance with the non-terrestrial network part mobility scheme, the communications device periodically transmits uplink reference symbols to the non-terrestrial network part.

5. A method according to claim 3, wherein, in accordance with the non-terrestrial network part mobility scheme, the communications device periodically determines a location of the communications device and transmits an indication of the location of the communications device to the non-terrestrial network part.

6. A method according to claim 3, wherein, in accordance with the non-terrestrial network part mobility scheme, the communications device refrains from measuring signals transmitted on frequencies not used by one or more non-terrestrial network parts.

7. A method according to claim 3, wherein, in accordance with the non-terrestrial network part mobility scheme, the communications device measures signals transmitted only on frequencies used by one or more non-terrestrial network parts.

8. A method according to claim 1, wherein determining whether the coverage area of the first cell overlaps with the region associated with the coverage area of the at least one non-serving cell comprises:
    receiving a paging message transmitted by the non-terrestrial network part, the paging message comprising an indication that at least a portion of the coverage region of the serving cell is within a region associated with a coverage area of a cell generated by one or more terrestrial infrastructure equipment.

9. A method according to claim 1, wherein the determining whether the coverage area of the first cell overlaps with the region associated with the coverage area of the at least one non-serving cell comprises:
    receiving a system information message transmitted by the non-terrestrial network part, the system information message comprising an indication that at least a portion of the coverage region of the serving cell is within a region associated with a coverage area of a cell generated by one or more terrestrial infrastructure equipment.

10. A method according to claim 1, wherein the determining whether the coverage area of the first cell overlaps with the region associated with the coverage area of the at least one non-serving cell comprises:
    receiving an indication transmitted by the non-terrestrial network part that an identity associated with the wireless communications network is equivalent to an identity associated with another wireless communications network, and the other wireless communications network comprises the infrastructure equipment associated with the at least one non-serving terrestrial cell.

11. A method according to claim 1, wherein the determining whether the coverage area of the first cell overlaps with the region associated with the coverage area of the at least one non-serving cell comprises:

receiving a frequency indication transmitted by the non-terrestrial network part to the communications device, the frequency indication comprising an indication of the frequency which is used for transmissions by infrastructure equipment associated with the at least one non-serving cell.

12. A method according to claim 1, wherein the determining whether the coverage area of the first cell overlaps with the region associated with the coverage area of the at least one non-serving cell comprises:

determining a location of the communications device;
determining whether the location of the communications device is within a pre-determined region associated with the at least one non-serving cell.

13. A method according to claim 1, further comprising changing from the first cell as the serving cell to the at least one non-serving cell as the serving cell for the communication device based on said determining whether to change from the first cell as the serving cell to the at least one non-serving cell as the serving cell for the communication device or to keep the first cell as the serving cell for the communications device.

14. A method for an infrastructure equipment of a non-terrestrial wireless communications network, the non-terrestrial wireless communications network comprising a non-terrestrial network part and a non-terrestrial base station, the method comprising:

transmitting an indication in a non-terrestrial cell generated by the non-terrestrial network part that a coverage area of the non-terrestrial cell overlaps with a region associated with a coverage area of the at least one cell generated by another infrastructure equipment, and changing service from the non-terrestrial cell as the serving cell to the at least one cell generated by said another infrastructure equipment as the serving cell for a communication device, wherein each of the at least one cell generated by another infrastructure equipment is a terrestrial cell generated by terrestrial infrastructure equipment, and the indication comprises an indication that the coverage area of the non-terrestrial cell generated by the non-terrestrial network part overlaps with a region associated with a coverage area of at least one terrestrial cell.

15. A method according to claim 14, the method comprising:

determining whether the coverage area of the non-terrestrial cell overlaps with the region associated with the coverage area of the at least one cell generated by said other infrastructure equipment, wherein transmitting the indication is in response to determining that the coverage area of the non-terrestrial cell generated by the non-terrestrial network part overlaps with the region associated with the coverage area of at least one cell generated by another infrastructure equipment.

16. A method according to claim 14, the method comprising:

transmitting a paging message, the paging message including the indication.

17. A method according to claim 14, the method comprising:

transmitting a system information message, the system information message including the indication.

18. A method according to claim 14, wherein the indication comprises an indication that an identity of the wireless communications network is equivalent to an identity of another wireless communications network, and the other wireless communications network comprises the other infrastructure equipment.

19. A method according to claim 14, wherein the infrastructure equipment is the non-terrestrial base station.

20. A method for a core network equipment of a wireless communications network, the wireless communications network comprising a non-terrestrial network part, the method comprising:

receiving from a communications device a tracking area update request, the tracking area update request identifying a tracking area, the tracking area comprising a plurality of cells, the plurality of cells comprising one or more non-terrestrial cells generated by the non-terrestrial network part, determining whether the coverage area of the plurality of cells overlaps with a region associated with a coverage area of at least one terrestrial cell, and in response to determining that the coverage area of the one or more non-terrestrial cells overlaps with the region associated with the coverage area of the at least one terrestrial cell, transmitting to the communications device a response to the tracking area update request, the response indicating that an identity of the wireless communications network is equivalent to an identity of another wireless communications network, the other wireless communications network comprising infrastructure equipment to generate the at least one terrestrial cell, and determining whether to change from one of the one or more non-terrestrial cells generated by the non-terrestrial network part as the serving cell to the at least one terrestrial cell as the serving cell for the communication device or to keep the one or more non-terrestrial cells as the serving cell for the communications device.

* * * * *